March 29, 1949.   E. ZIKA   2,465,623
MILK STRAINER
Filed Oct. 17, 1945
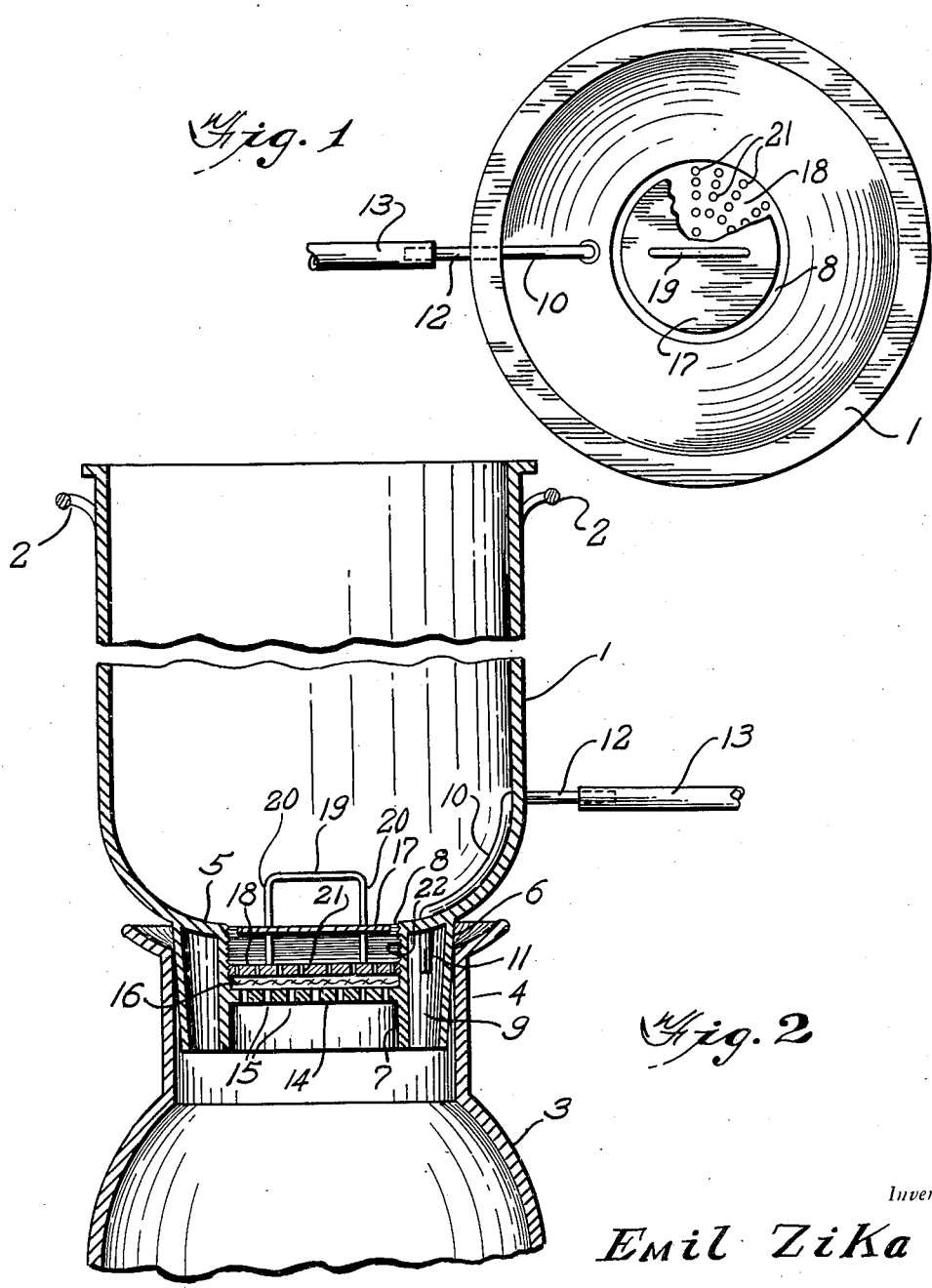
Inventor
Emil Zika
By Clarence A. O'Brien
and Harvey B. Jacobson
Attorneys Patented Mar. 29, 1949

2,465,623

UNITED STATES PATENT OFFICE 2,465,623

MILK STRAINER

Emil Zika, Algoma, Wis.

Application October 17, 1945, Serial No. 622,827

1 Claim. (Cl. 210—159)

This invention relates to a strainer which is particularly adapted for use in straining milk, it being understood that it may be used for straining other liquids and removing foreign matter from the same.

One object of the invention is to provide a strainer having a body adapted to receive a large quantity of milk to be strained and a neck extending downwardly therefrom for fitting tightly in the neck of a milk can, there being provided a tube through which air may be withdrawn from the can and thus create a partial vacuum in the can so that flow of milk will not be retarded by presence of air under pressure in the can.

Another object of the invention is to provide a milk strainer wherein the neck of the strainer is provided with improved means for holding sheets of filtering material or pads which are firmly held in place under such pressure that milk will be caused to flow through the pad at a desired rate of speed.

Another object of the invention is to so form the throat through which the milk flows that after filtering material has been placed therein upon a perforated partition in the throat, a pressure applying device may be screwed into the throat for holding the pads in place and applying predetermined pressure to them.

Another object of the invention is to so form the strainer that the means for holding the pads in place under predetermined pressure may be very easily removed and all elements of the improved strainer thoroughly cleaned before the strainer is again used.

Another object of the invention is to provide a strainer which is very effective in operation and is of a simple construction.

The invention is illustrated in the accompanying drawings wherein—

Figure 1 is a top plan view of the improved strainer, and

Figure 2 is a vertical sectional view showing the improved strainer applied to a milk can.

This improved strainer has a body portion 1 which is circular in cross section and may be of any desired depth and diameter according to the quantity of milk which it is desired to have the body or receptacle 1 hold. Handles 2 extend from opposite sides of the body or receptacle adjacent its upper end in order that it may be conveniently lifted and set in place upon a milk can 3 and also allow it to be easily dislodged from the neck 4 of the milk can after the milk has been strained.

At its lower end, the walls of the receptacle curve inwardly and merge with the bottom 5, thus eliminating a crevice between the bottom and the annular wall of the receptacle and preventing undesired accumulation of bacteria at the bottom of the receptacle.

A neck 6 extends downwardly from the receptacle about the bottom thereof and this neck tapers downwardly so that when the neck is fitted into the neck of the milk can, a very tight joint may be formed between the neck of the strainer and the neck of the milk can.

There has also been provided a cylindrical throat 7 which extends downwardly from the bottom of the receptacle 1 about an opening 8 and this throat is in spaced and concentric relation to the neck 6 to provide space 9 between the neck and the throat. A tube 10 is mounted radially of the lower portion of the receptacle and curves longitudinally so that it may be soldered or brazed to the inwardly curving lower portion of the annular wall of the receptacle and thus be out of the way. The lower portion 11 of the tube 10 passes through the bottom of the receptacle into the space 9, and the upper portion 12 of the tube passes outwardly through an opening in the wall of the receptacle. This is clearly shown in Figure 2, and referring to this figure, it will be seen that when a hose 13 leading from a suction pump is connected with the outer end portion 12 of the tube 10, air may be withdrawn from the space 9 and a partial vacuum created within the milk can.

A partition 14 is rigidly mounted in the throat 7 in spaced relation to upper and lower ends thereof and this partition is formed with radially extending rows of small perforations 15 so that milk may flow through the partition. A pad 16 which may consist of a suitable number of sheets of filter paper or formed as a single pad of suitable material and appropriate thickness rests upon the partition 14 and is of such diameter that it will fit snugly in the throat. This filtering pad must be firmly held in place and subjected to predetermined pressure in order that the speed at which milk flows through the filtering pad may be controlled. In order to do so, there has been provided a pressure applying device consisting of upper and lower disks 17 and 18 and a handle 19 formed from a strand of stiff metal and having its arms 20 extending downwardly through the upper disk 17 and solidly secured at their lower ends to the disk 18. The upper disk is rigidly secured to the arms of the handle so that it will be maintained in vertical spaced relation to the lower disk and this upper disk is of such diameter that its marginal edge will be spaced from the throat and thus provide space between the upper disk and the throat through which milk in the receptacle may flow. The lower disk is formed with radially extending lines of small perforations 21 and its marginal edge is threaded for engagement with the internal threads 22 of the portion of the throat between the partition 14 and the upper end of the throat. It will thus be seen that after the filtering pad has been set in place upon the partition, the pressure applying device may be applied with its lower disk in threaded engagement with the throat and the pressure applying device then screwed downwardly into the throat until the lower disk engages the filtering pad. The filtering pad will thus be held firmly against the partition 14 and subjected to controlled pressure according to the extent to which the pressure applying device is screwed downwardly in the throat.

When this strainer is in use, it is applied to a milk can, as shown in Figure 2, and the suction pump from which the hose 13 extends set in motion so that air will be withdrawn from the milk can through the space 9 between the neck and the throat of the strainer. Milk is poured into the receptacle 1, and since this is a large receptacle it will hold a large quantity of milk. The milk flows through the space between the upper disk 17 and the upper end of the throat, and upon reaching the lower disk 18, it flows through the perforations 21 and then passes through the filtering pad 16 and through the perforations of the partition 14 and downwardly into the milk can. In view of the fact that air is withdrawn from the milk can, air under pressure will be prevented from gathering in the upper portion of the can as the can is gradually filled with milk and since a partial vacuum will be formed in the can by withdrawal of air, flow of milk may take place at a speed which will insure rapid straining of the milk and at the same time the milk be prevented from having uncontrolled flow which might cause it to pass through the filtering pad at too rapid a rate of speed for effective filtering of the milk. After all of the milk has passed through the strainer and into the milk can, the handles 2 are grasped and the strainer withdrawn from the neck of the milk can which will be immediately closed by application of a conventional form of cap. Any dust or other foreign matter in the milk will be held back by the perforated disk 18 and the filtering pad. After the strainer has been removed from the milk can, the pressure applying device will be grasped by its handle and unscrewed from the throat, after which the filtering pad will be removed and discarded and the strainer and pressure applying device then thoroughly washed and sterilized.

It is thought that persons skilled in the art to which the invention relates will be able to obtain a clear understanding of the invention after considering the description in connection with the drawings. Therefore, a more lengthly description is regarded as unnecessary.

Minor changes in the shape, size and arrangement of details coming within the field of invention claimed may be resorted to in actual practice, if desired.

Having thus described the invention, what is claimed is:

A strainer comprising a receptacle having a bottom formed with an outlet, a tubular throat internally threaded and extending downwardly from the bottom about the outlet and provided with a perforated partition extending horizontally in the throat intermediate its depth, a neck extending downwardly from the bottom of said receptacle in concentric spaced relation to said throat for fitting within a neck of a container, a filtering pad resting upon said partition within the throat, a pressure applying device including a perforated disk externally threaded and screwed into the throat from the upper end thereof and bearing against said pad, and a tube in said receptacle close against the wall thereof and having its lower end portion extending through the bottom of the receptacle into space between the throat and the neck and its upper portion passing outwardly through the wall of the receptacle for connection with suction means whereby air may be withdrawn and a partial vacuum formed in the container.

EMIL ZIKA.

REFERENCES CITED

The following references are of record in the file of this patent:

UNITED STATES PATENTS

| Number | Name | Date |
| --- | --- | --- |
| 197,836 | Dodge | Dec. 4, 1877 |
| 473,081 | Rahn | Apr. 19, 1892 |
| 789,062 | Prescott | May 2, 1905 |
| 1,085,626 | Mueller | Feb. 3, 1914 |
| 1,115,505 | Chapin | Nov. 3, 1914 |
| 1,695,306 | Wiemer | Dec. 18, 1928 |
| 1,918,836 | Demers | July 18, 1933 |
| 2,209,447 | Dowling | July 30, 1940 |
| 2,213,237 | Hois | Mar. 9, 1943 |